(No Model.)
A. WRIGHT.
KNIFE.
No. 604,850. Patented May 31, 1898.
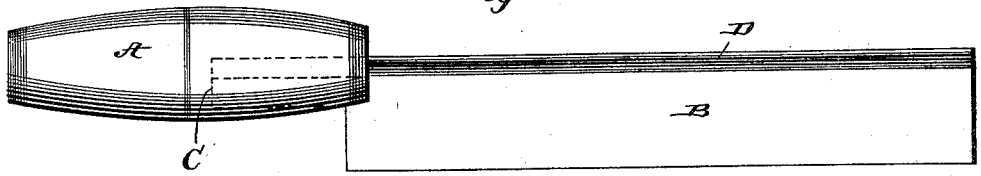
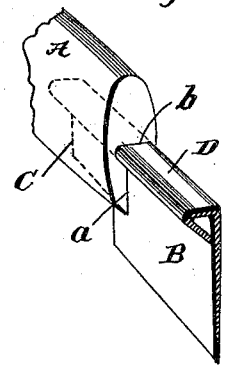
Witnesses:
Inventor
Aaron Wright
By James J. Sheehy
Attorney

UNITED STATES PATENT OFFICE.

AARON WRIGHT, OF HUDSON, NEW YORK.

KNIFE.

SPECIFICATION forming part of Letters Patent No. 604,850, dated May 31, 1898.

Application filed February 13, 1897. Serial No. 623,300. (No model.)

*To all whom it may concern:*

Be it known that I, AARON WRIGHT, a citizen of the United States, residing at Hudson, in the county of Columbia and State of New York, have invented certain new and useful Improvements in Knives; and I do declare the following to be a full, clear, and exact description of the invention, such as will enable others skilled in the art to which it appertains to make and use the same.

My invention relates to that class of knives which are designed more especially for cutting bread, cake, and the like; and its novelty and advantages will be fully understood from the following description and claim when taken in conjunction with the annexed drawings, in which—

Figure 1 is a side elevation of a knife embodying my invention, and Fig. 2 is a sectional perspective view of a portion of said knife.

Referring by letter to said drawings, A indicates the handle of the knife.

B indicates the blade, which may have a straight cutting edge or a fluted or corrugated cutting edge, as desired, and C indicates the shank of the blade, which is formed integral therewith. The blade B, for the sake of cheapness, is made very thin, and in order to render it stiff and rigid, and thereby increase its efficiency in cutting bread, meat, and other substances, I provide it on its right side, at its back, with the stiffening portion D. This stiffening portion D extends the full length of the blade and is continued the full length of the shank C, and it is consequently adapted to stiffen and strengthen the shank as well as the blade.

The handle A of the knife, which may be of any material suitable to the purpose, is provided with the recess $a$, which is open at the lower edge or side and at the forward end of the handle, as shown. This recess $a$ is designed to snugly receive the shank C of the blade B, and it therefore has its upper portion enlarged, as indicated by $b$, and shaped in conformity to the stiffening portion D at the upper edge of the shank, so as to receive and hold said stiffening portion D. From this it will be seen that in addition to increasing the strength and rigidity of both blade and shank the stiffening portion D prevents the shank from working in the direction of its width out of the handle, thus rendering it unnecessary to employ bolts, rivets, or the like for connecting the handle and the shank.

In making the blade and its shank the upper portion of the same is bent laterally until its edge abuts against the side of the main portion of blade and shank, as illustrated, so as to form a barrel, which is well adapted to stiffen the blade and which at the same time is not likely to catch upon the top of the loaf of bread or cake, and thereby impede the passage of the blade through the same.

It will be appreciated from the foregoing that I have provided a cheap and simple means for strengthening and increasing the rigidity of the blade and its shank and utilize such means to secure the handle on the shank.

Having thus described my invention, what I claim is—

As an improved article of manufacture, the herein-described knife comprising the handle having a recess open at the lower edge and forward end of the handle, and provided with the upper enlarged portion, and the blade having the integral shank and also having the stiffening portion D, at its upper edge extending throughout the length of the blade and shank; the said shank being arranged in the recess of the handle with the stiffening portion D, in the upper enlarged portion of said recess, substantially as specified.

In testimony whereof I affix my signature in presence of two witnesses.

AARON WRIGHT.

Witnesses:
SAMUEL N. HOLSAPPLE,
E. MITCHELL WALDRON.